(12) United States Patent
Schmidt et al.

(10) Patent No.: US 10,444,087 B2
(45) Date of Patent: Oct. 15, 2019

(54) CAPACITIVE FORCE SENSOR HAVING IMPROVED ATTACHMENT

(71) Applicant: PREH GMBH, Bad Neustadt a. d. Saale (DE)

(72) Inventors: Benedikt Schmidt, Bad Neustadt (DE); Thomas Zirkelbach, Bad Neustadt (DE); Harald Ment, Oberstreu (DE); Jürgen Nauth, Stangenroth (DE); Thilo Schultheis, Bad Neustadt (DE); Sara Hofmann, Wülfershausen (DE); Matthias Müller, Wollbach (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 0 days.

(21) Appl. No.: 15/864,626

(22) Filed: Jan. 8, 2018

(65) Prior Publication Data

US 2018/0195912 A1 Jul. 12, 2018

(30) Foreign Application Priority Data

Jan. 11, 2017 (DE) .................. 10 2017 100 445

(51) Int. Cl.
 *G01L 1/14* (2006.01)
(52) U.S. Cl.
 CPC ............... *G01L 1/14* (2013.01); *G01L 1/142* (2013.01)
(58) Field of Classification Search
 CPC .................................. G01L 1/14; G01L 1/142
 USPC ........ 73/862.626, 862.29, 862.381, 862.451, 73/862.621
 See application file for complete search history.

(56) References Cited

U.S. PATENT DOCUMENTS

| 2002/0194919 | A1* | 12/2002 | Lee | .................. | G01L 9/0042 |
| | | | | | 73/718 |
| 2007/0284682 | A1* | 12/2007 | Laming | ............... | B81C 1/00158 |
| | | | | | 257/416 |
| 2008/0208414 | A1* | 8/2008 | Linssen | ............. | B60R 21/01532 |
| | | | | | 701/46 |
| 2009/0190630 | A1* | 7/2009 | Hong | .................... | G01K 1/143 |
| | | | | | 374/208 |

(Continued)

FOREIGN PATENT DOCUMENTS

| DE | 4027753 A1 | 3/1992 |
| DE | 102014117991 A1 | 6/2016 |

*Primary Examiner* — Natalie Huls
*Assistant Examiner* — Suman K Nath
(74) *Attorney, Agent, or Firm* — M&B IP Analysts, LLC

(57) ABSTRACT

The present disclosure relates to a capacitive force sensor. The capacitive force sensor includes a planar base body, a supported membrane body, two spacers disposed spaced apart to each other, where the membrane body abuts the planar base body via the spacers, and wherein a cavity is formed between the membrane body and the planar base body to allow displacement or deflection of the membrane body under a force onto the membrane body in the area between the spacers. The membrane body forms a first electrode and, a second electrode is provided on the planar base body, wherein the first and second electrode define a first precision capacitor with changing measuring capacity depending on the force. An electrical bracket extends from each of the spacers for electrically contacting the first electrode and forms a bend between each of the associated spacer and a bottom of the base body.

13 Claims, 2 Drawing Sheets

(56) References Cited

U.S. PATENT DOCUMENTS

2012/0118080 A1* 5/2012 de Boissieu ............. G01B 5/28
　　　　　　　　　　　　　　　　　　　　　73/862.043
2017/0268946 A1* 9/2017 Schultheis ................ G01L 1/14

* cited by examiner

US 10,444,087 B2

CAPACITIVE FORCE SENSOR HAVING IMPROVED ATTACHMENT

This application claims priority to the German Application No. 102017100445.9, filed Jan. 11, 2017, now pending, the contents of which are hereby incorporated by reference.

The present disclosure relates to a capacitive force sensor with a planar base body as well as a planar resilient membrane body. In known force sensors, the membrane body abuts the planar base body via one or more spacers, so that between the membrane body and the planar base body a cavity is formed, which is confined by a surface of the membrane body and a surface of the planar base body. When force is applied to the membrane body, the volume of the cavity changes. Generally, the surfaces of the planar base body and of the membrane body confining the cavity comprise a metal layer or coating, thus forming electrodes opposite to each other of a precision capacitor with measuring capacity. For example, the cavity is filled with air as a dielectric.

Since the membrane body comprises a specific resilient flexibility, it responds to effect of force by deflection. Change of distance of the electrodes to each other, and consequently capacity of the capacitor defined by the cavity or the electrodes, respectively, result therefrom. Appropriate capacitive force sensors are frequently comprised in electronic components, so that it has been known to form the planar base body including associated electrode from a circuit board, such as it is known for example from U.S. Pat. No. 5,134,886 A.

The disadvantage of said force sensors is the fact that deflection under effect of force of the membrane body in addition imposes mechanical stress to electrical contact thereof with the planar base body. It has been shown that integral connection provided in the transition area between the membrane body and the planar base body, such as a solder connection, in conventional force sensors, is exposed to large stress, thus risking this connection not to be durable.

Therefore, there is a need for a capacitive force sensor, in which electrical contact may be provided with simultaneously high mechanical and thermal robustness of the force sensors in a permanently durable way. This object will be solved by a force sensor according to Claim 1 as well as by an operating element according to Claim 11. An appropriately advantageous use is the subject matter of the Use Claim. Advantageous embodiments are the subject matter of the dependent Claims. It is to be noted that the features as individually set forth in the Claims may be combined with each other in any technologically reasonable way, representing other embodiments of the present disclosure. The description, especially in the context with the Figures, additionally characterizes and specifies the present disclosure.

The present disclosure relates to a capacitive force sensor. The capacitive force sensor according to the present disclosure comprises a planar base body as well as a planar, resilient and/or resiliently supported membrane body. According to the present disclosure, two spacers arranged spaced apart from each other are provided between the planar base body and the membrane body, wherein the membrane body is loosely supported on the planar base body via the spacers. Loosely supporting means that the spacers abut the planar base body without any attaching means to be provided between the spacers and the planar base body. Between the membrane body and the planar base body, a cavity is formed in the area between the spacers to allow displacement, such as deflection, in the area between the den spacers upon effect of force F to the membrane body, for example operating force acting towards the planar base body. "Planar" in the sense of the present disclosure means a body, which, in two directions, has dimensions that are substantially larger, for example at least by the factor of 10 larger than in the remaining dimension. For example, the dimension of the membrane body in the latter direction is less than 2 mm, for example 1.5 or 1.0 mm, still more preferably less than 1 mm, for example 0.5 mm. For example, the membrane body is formed as a rectangular entity.

According to the present disclosure, the membrane body forms a first electrode, for example by way of a coating of the membrane body of conductive material or by manufacturing the membrane body of conductive material. According to the present disclosure, a second electrode is formed on the planar base body, for example by a coating of conductive material. The first and second electrodes define a first precision capacitor with measuring capacity changing depending on the effect of force F. For electrically contacting the first electrode, at least one electrical bracket extending from each one of the spacers is provided, which forms a bottom for abutting the planar base body. According to the present disclosure, the electrical bracket is integrally connected to the planar base body via the bottom, and is preferably soldered thereto. According to the present disclosure, the electrical bracket comprises a clearance between the spacer and the bottom in relation to the base body providing the bend, to resiliently attach the membrane body to the planar base body. For example, the bend is defined by two portions of the electrical bracket that are angularly tilted to the bearing surface of the planar base body.

By way of the displacement of the attachment between the membrane body and the planar base body into the region of the electrical bracket and the bent resilient shape of the electrical bracket, the attachment and the connection required for electrical contact are largely mechanically decoupled from the effect of force to be detected, so that no substantial mechanical effect of force to the bottom, and from this connection, to the planar base body will result, whereas loose abutting of the spacer assures reliable displacement or deformation, respectively, of the membrane body, thus assuring reliable, which means reliable-repeatedly occurring change of the measuring capacity.

Thus, mechanical separation of this attachment and consequently electrical contact in combination with total failure of the force sensor is excluded.

Furthermore, the electrical bracket prevents excessive heat input into the membrane body during soldering the bottom to the planar base body.

It is preferred for the bottom to be connected to the planar base body by soldering, for example in a reflow process, in a wave or torrent soldering bath apparatus. For example, the bottom comprises a surface area of more than 2 mm. Preferably, the bottom is solderably coated, for example gold-plated. In order to assure durable soldering and flat abutting of the bottom, the electrical bracket comprises a free end adjacent to the bottom, the free end extending away from the base body. For example, the end is cropped.

In a preferred embodiment of the force sensor according to the present disclosure, the planar base body is a circuit board and the second electrode is formed by a metallic coating or a metallic layer of the circuit board. The circuit board, in the sense of the present disclosure, comprises a non-conductive one, or a multi-layer circuit board substrate having applied thereon or introduced therein conductive, preferably metallic layers. For example, the second electrode is arranged below the membrane body and is preferably arranged on the surface of the circuit board facing the membrane body. According to another embodiment, the conductive layer is embedded into the circuit board substrate. According to another embodiment, it is provided for the conductive coating to be furthermore coated with a non-conductive protective varnish. The metallic coating is for example a copper cladding that is provided on the surface of the circuit board substrate facing the membrane body. The copper layer may in addition be gold-plated. This conductive layer or coating defines the second electrode of the at least two electrodes of the capacitor with force-dependent measuring capacity provided by the force sensor.

Preferably, the capacitive force sensor is designed such that the measuring capacity increases with increasing effect of force forcing the membrane body to the planar base body.

Preferably, it is provided that, with no force effect, the maximum clearance between the membrane body and the planar base body to be not more than 0.25 mm, preferably not more than 0.1 mm.

For simplification of the manufacture of the force sensor according to the present disclosure and for simplified electrical contact, the membrane body is a spring-resilient metal member forming the first electrode of the force sensor. The membrane body preferably is a sheet metal member, and still more preferably is a spring steel sheet metal strip.

According to a preferred embodiment, the membrane body and the spacers are integrally formed. Preferably, the spacers are embossed into the membrane body in a shaping embossing process.

For example, the spacers are embossed into membrane body that is formed as a sheet metal member, as crimps running parallel to each other.

According to a preferred embodiment, material attenuations, such as perforations, are provided between the membrane body and the spacer. In this way, the resilient deformation associated with the effect of force is focused to the transition area between the spacers and the membrane body, wherein a displacement as parallel as possible of the membrane body and consequently significant change of the measuring capacity is caused, which improves detection accuracy of the force sensor.

According to a preferred embodiment, an electrical bracket is provided at every spacer, the respective electrical brackets extending along the circumference of the membrane body, preferably in the same circulating direction. In this way, installation space may be saved. For example, the electrical brackets each extend along the circumferential region of the membrane body, on which no spacers are provided.

According to one embodiment, at least the membrane body, preferably the membrane body, the spacers and the at least one electrical bracket, are manufactured as a stamped part.

According to another embodiment, at least a third electrode covering the membrane body at least partially is provided, which is disposed on the side of the membrane body facing away from the planar base body and is disposed electrically insulated to the membrane body, the first and third electrodes defining a second precision capacitor with measuring capacity changing depending on the effect of force F. For example, the third electrode is also formed of a sheet metal member, preferably a metallic sheet metal member. In one embodiment, simultaneous detection of an additionally changing measuring capacity is used for verification of the detection.

The present disclosure furthermore relates to an operating element, which comprises a capacitive force sensor of the embodiments previously described as well as a movable actuating member defining an actuating surface, acting on the membrane body, as well as an analyzing unit to measure an actuating force applied to the actuating member by way of the capacitive force sensor. For example, the actuating member furthermore comprises a touch-sensitive surface to perform space-dissolving touch detection, while measuring the actuating force with the capacitive force sensor.

Preferably, the membrane body comprises a central protrusion, and between the actuating member and the protrusion, a plunger abutting the protrusion is provided. In this way, a resulting abutment as punctual as possible and largely independent of the plunger adjustment between the plunger and the membrane body is achieved. Moreover, the plunger may comprise a wear-reducing coating. The protrusion serves to have a specified point for the force effect. Positional tolerances of the circuit board towards the mechanics as well as inaccuracies resulting from the population and solder process will thus be eliminated. Moreover, adjustment tolerances of the plungers may thus be compromised.

The present disclosure furthermore relates to the use of the operating elements in one of the above-mentioned embodiments in a motor vehicle.

The present disclosure will be explained in detail by way of the following figures. The Figures are to be understood only as exemplary and are construed to merely represent preferred embodiments, wherein.

Figure 1:
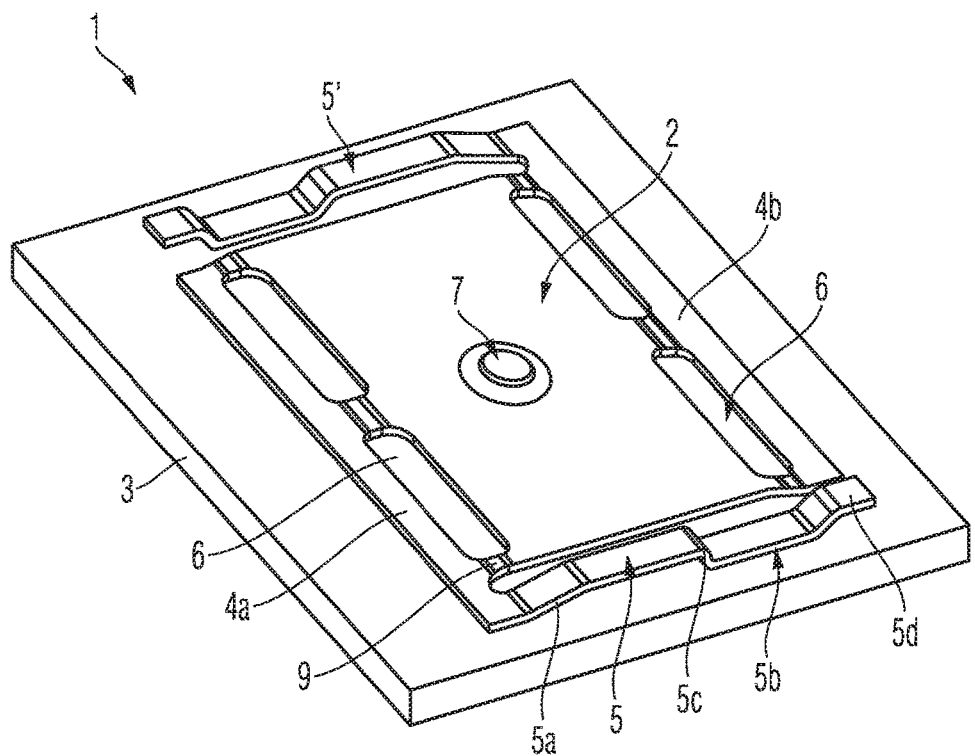
FIG. 1 is a perspective view of a first embodiment of the force sensor 1 according to the present disclosure.
Figure 2:
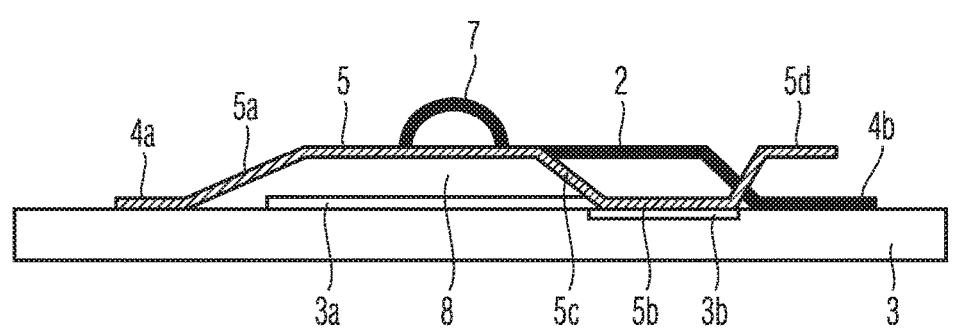
FIG. 2 is a lateral view of the first embodiment of the force sensor 1 according to the present disclosure shown in FIG. 1.

FIG. 1 shows a first embodiment of the force sensor 1 according to the present disclosure, comprising a planar base body 3 in the form of a circuit board. A sheet metal member stamped and embossed of spring steel is disposed on this planar base body 3, this sheet metal member forming an essentially planar membrane body 2, two electrical side brackets 5, 5' and two spacers 4a, 4b, that are integrally connected. As shown in FIG. 2, the membrane body 2 is disposed in a clearance in relation to the planar base body 3, thus forming a cavity 8. As it is furthermore shown in FIGS. 1 and 2, the membrane body 2 is supported on planar base body 3 via spacers 4a and 4b provided on two opposite edges of the membrane body 2. The transition between the membrane body 2 to the respective spacers 4a and 4b, respectively, is provided with multiple perforations 6 resulting in material attenuations in the form of bars 9, conferring increased resiliency to the membrane body 2 in this area.

In the center, the membrane body 2 comprises a dome-shaped protrusion 7 defining a point of attack for an action force to be measured by the force sensor 1, towards the planar base body 3. In the case of force action, the bars 9 provide for an approximately parallel displacement of the membrane body 2 against an elastic return force resulting from the material. The strip-shaped spacers 4a, 4b loosely abut the planar base body 3, so that displacement thereof in a direction parallel to the bearing surface of the planar base body 3 is enabled during application of the force to be measured. While a conductive layer 3a forms a second electrode at the planar base body 3, i.e. on the circuit board, the first electrode is defined by the sheet metal member consisting of conductive material, herein spring steel, and is especially defined by the membrane body 2. Upon voltage application, they form a measuring capacity of an analyzing unit not represented in detail, which varies depending on the effect of force and approach of the membrane body 2 to the planar base body 3. A lateral electrical bracket 5, 5', respectively, for electrically contacting the membrane body 2 and thus the first electrode is provided at each of the spacers 4a, 4b that both are integrally connected to the associated spacer 4a, 4b. The electrical bracket 5, 5' are formed identically, and thus are dimensioned identically as well, extending along two opposing edges along the circumference of the membrane body 3, specifically: at the edges, where no spacer 4a, 4b is provided, wherein the circulating direction, i.e. the course thereof towards the associated free end, is similar for each of the two electrical brackets.

The electrical bracket 5, 5' each comprises a bottom 5b, which is soldered to an associated metallic layer 3b of the planar base body 3, herein the circuit board. For mechanical decoupling of the bottom 5b or the associated soldering, respectively, the electrical bracket 5 or 5', respectively, each form a clearance in relation to the base body 3 providing the bend, resulting from the portions 5a, 5c of the electrical brackets 5, 5' that each are angled in relation to bearing surface of the planar base body. This bracket provides for a resilient flexibility of the electrical brackets 5, 5' in the area between the bottom 5b and the associated spacer 4a, 4b and relieves the soldering of the bottom 5b upon mechanical stress of the force sensor 1.

Figure 3:
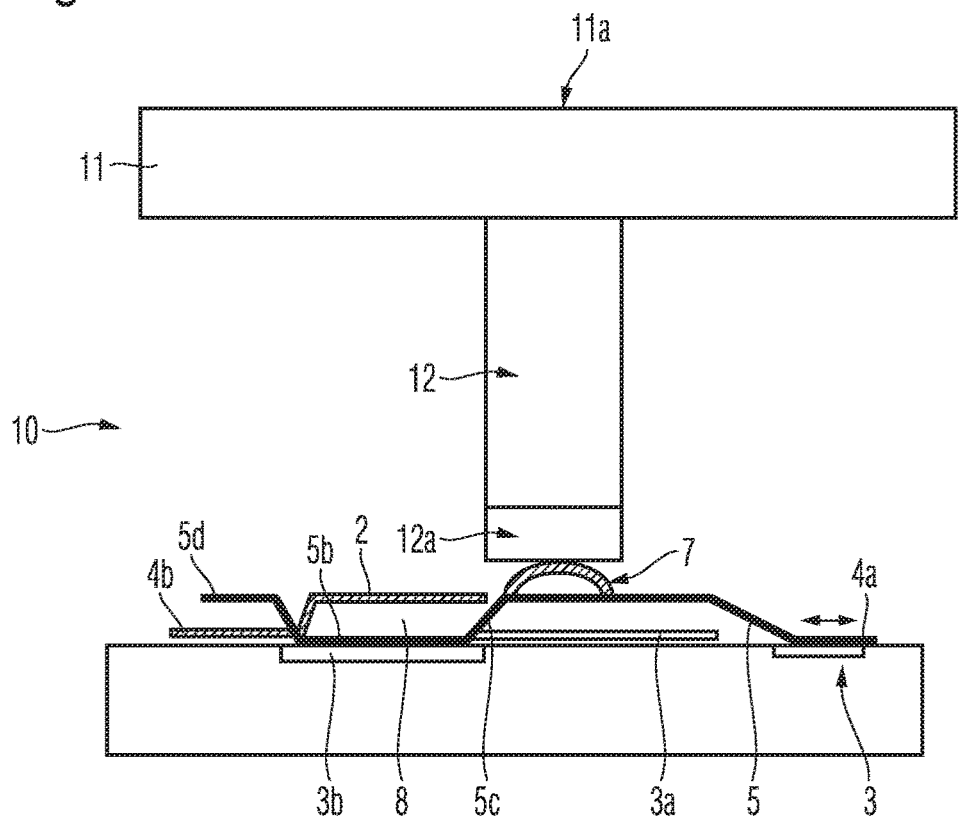
FIG. 3 is a lateral view of an operating element 10 according to the present disclosure.

FIG. 3 shows an operating element 10 according to the invention using the force sensor 1 shown in FIG. 1. The operating element comprises an actuating member 11 movably supported in relation to the planar base body 3 and defining an actuating surface 11a. Said actuating member forming a plunger 12, which, at its free end provided for cooperating with the force sensor, comprises a coating of a more resilient material 12a as compared to that of the plunger 12, to reduce wear and to allow free play. In the center, the membrane body 2 in turn comprises a dome-shaped protrusion 7 defining a point of attack of the plunger 12 and the action force applied via the actuating member and to be measured acting in the direction of the planar body 3. In the case of an an acting force, an approximately parallel displacement of the membrane body 2 against a resilient return force resulting from the material of the membrane body 2 will be caused. The strip-shaped spacers 4a, 4b loosely abut the planar base body 3, so that displacement thereof in a direction parallel to the bearing surface of the planar base body 3 is enabled during application of the force to be measured, as it is indicated by the double arrow. While a conductive layer 3a forms a second electrode at the planar base body 3, i.e. on the circuit board, the first electrode is defined by the sheet metal member consisting of conductive material, herein spring steel, and is especially defined by the membrane body 2. Upon voltage application, they form a measuring capacity of an analyzing unit not represented in detail, which varies depending on the effect of force and the approach of the membrane body 2 to the planar base body 3. For electrically contacting the membrane body 2 and thus the first electrode, a lateral electrical bracket 5 or 5', respectively, is provided on each of the spacers 4a, 4b, which is integrally connected to the associated spacer 4a, 4b.

For electrically contacting the membrane body 2 and thus the first electrode, a lateral electrical bracket 5 or 5', respectively, is provided on each of the spacers 4a, 4b, which is integrally connected to the associated spacer 4a, 4b and which are each identically formed and dimensioned.

The electrical bracket 5 has a bottom 5b each, which is soldered to the associated metallic layer 3b of the planar base body 3, herein the circuit board. For mechanically decoupling the bottom 5b or the associated soldering, respectively, the electrical bracket 5 each forms a clearance in relation to the bend providing the base body 3, resulting from the portions 5a, 5c of the electrical bracket 5 that are angled in relation to the bearing surface of the planar base body. This bracket provides for a resilient flexibility of the electrical bracket 5 in the area between the bottom 5b and associated spacer 4a, 4b, relieving the soldering of the bottom 5b from mechanical stress. The electrical bracket 5 each comprises a free end 5d adjacent to the bottom 5b, the free end extending away from the base body 3.

Figure 4:
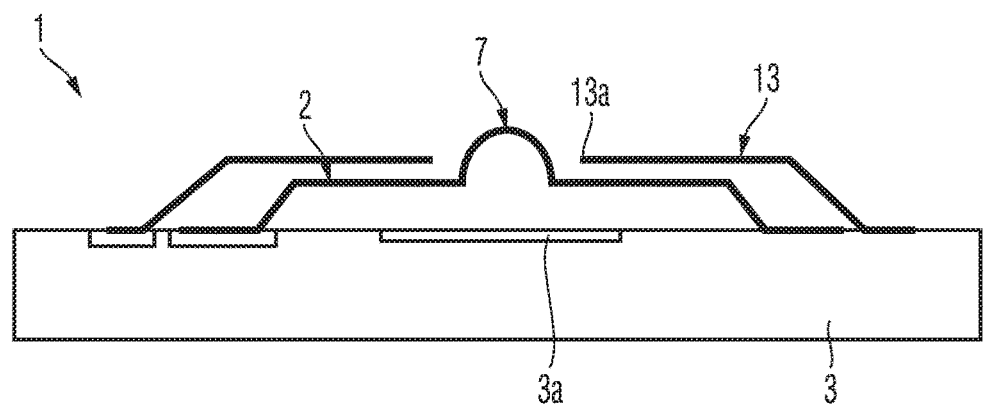
FIG. 4 is a sectional view of a second embodiment of the force sensor 1 according to the present disclosure.

FIG. 4 shows another embodiment of the force sensor 1 according to the present disclosure, which differs from the embodiment shown in FIG. 1 in that another third electrode electrically insulated towards the first and second ones is provided in the form of a metallic sheet metal member 13. The latter covers the membrane body 2 at least partially and is disposed at the side of the membrane body 2 facing away from the planar base body 3 and being electrically insulated, and for example is disposed maintaining an air gap in relation to the membrane body 2. The first and third electrode 13 define a second precision capacitor with a measuring capacity that changes depending on the effect of force F. In order to allow effect of force to the membrane body 2 the third electrode 13 comprises a perforation 13a, which is passed by dome-shaped protrusion 7 of the membrane body 3. In one embodiment, the simultaneous detection of an additional changing measuring capacity is used to verify the detection, thus resulting in a partially redundant design of the force sensor 1.

The invention claimed is:
1. A capacitive force sensor, comprising:
a planar base body;
a planar resilient or resiliently supported membrane body;
two spacers arranged spaced apart to each other, wherein the membrane body loosely abuts the planar base body via the spacers;
wherein between the membrane body and the planar base body, in the area between the spacers, a cavity is formed to allow displacement or deflection of the membrane body under effect of a force F onto the membrane body in the area between the spacers;
wherein the membrane body forms a first electrode, and a second electrode is provided at the planar base body;
wherein the first and second electrode define a first precision capacitor with a measuring capacity that increases with an increasing effect of force F forcing the membrane body to the planar base body;
wherein for electrically contacting the first electrode, at least one electrical bracket extending from each one of the spacers is provided, which forms a bottom for abutting the planar base body, via which the electrical bracket is integrally connected to the planar base body, the electrical bracket forming a clearance in relation to a bend providing the base body for resilient attachment of the membrane body to the planar base body between each one of the associated spacers and the bottom.
2. The capacitive force sensor of claim 1, wherein the planar base body is a circuit board and the second electrode is formed of a conductive coating or a conductive layer of the circuit board.

3. The capacitive force sensor of claim 1, wherein the membrane body is a spring-resilient metal member forming the first electrode of the force sensor, and especially is a sheet metal member.

4. The capacitive force sensor of claim 1, wherein the membrane body and the spacers are integrally formed.

5. The capacitive force sensor of claim 4, wherein the spacers are embossed into the membrane body.

6. The capacitive force sensor of claim 1, wherein the electrical bracket comprises a free end adjacent to the bottom extending away from the base body.

7. The capacitive force sensor of claim 1, wherein between the membrane body and the spacer material attenuations are provided, created by one or more perforations.

8. The capacitive force sensor of claim 1, wherein at each spacer an electrical bracket is provided, which each extend along the circumference of the membrane body in the same circulating direction.

9. The capacitive force sensor of claim 1, wherein the membrane body, the spacers and the at least one electrical bracket are manufactured as a stamped member.

10. The capacitive force sensor of claim 1, wherein a third electrode covering the membrane body at least partially is provided and disposed at the side of the membrane body facing away from the planar base body and electrically insulated to the membrane body, wherein the first electrode of the membrane body and the third electrode define a second precision capacitor with measuring capacity changing depending on the effect of force F.

11. The capacitive force sensor of claim 1 further comprising an operating element comprising:
   a movable actuating member defining an actuating surface, and acting on the membrane body; and
   wherein the capacitive force sensor is configured to measure the actuating force F applied to the actuating member by way of the capacitive force sensor.

12. The capacitive force sensor of claim 11, wherein the membrane body comprises a central protrusion and a plunger adjacent to the protrusion between the actuating member and the protrusion.

13. The capacitive force sensor of claim 11 configured for use in a motor vehicle.

* * * * *